United States Patent Office 3,344,188
Patented Sept. 26, 1967

3,344,188
d(—)-N-TERT.BUTYL- AND -N-ISOPROPYL-1-PHENYL-2-AMINO-ETHANOLS
Hartmund Wollweber, Rudolf Hiltmann, and Hans Kaller, Wuppertal-Elberfeld, and Hans-Günther Kroneberg, Haan, Rhineland, Germany, assignors to Farbenfabriken Bayer Aktiengesellschaft, Leverkusen, Germany, a corporation of Germany
No Drawing. Filed Oct. 8, 1964, Ser. No. 402,612
Claims priority, application Germany, Oct. 9, 1963, F 40,952
2 Claims. (Cl. 260—570.6)

The present invention relates to novel anti-diuretic compounds useful in therapy and to their production and more particularly, to d(—)-N-alkyl-1-phenyl-2-aminoethanols having specific activity for inhibiting excretion of water and salts.

Various compounds such as, for example morphine or N-isopropyl-noradrenaline are known to have anti-diuretic properties. Sympathomimetics, inter alia the di-amphetamine, have also recently been tested in this respect [Chemotherapie 6, page 363, (1963)] and on account of the results hitherto obtained, it has been assumed that in this series the sympathomimetic and the anti-diuretic activities exhibit a certain parallelism. In all these cases the anti-diuretic effect becomes apparent only if doses are administered which have a strong analgetic, broncholytic and blood pressure-depressing effect, or which stimulate the central nervous system. The anti-diuretic properties of the said compounds are, so to speak, side effects and therapeutically useless.

It has now been found that d(—)-N-alkyl-1-phenyl-2-aminoethanols of the formula

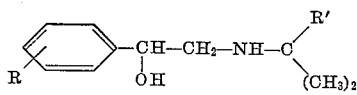

in which R is hydrogen, halogen, hydroxyl or trifluoromethyl, or lower alkyl, alkoxy or alkylmercapto, and R' is hydrogen or methyl, exhibit a marked anti-diuretic activity in animal tests whereby the excretion of water as well as of salts is inhibited. Other effects, especially those on the central nervous system, occur only if the dosages are many times higher. In contradistinction to the hitherto investigated other 1-phenyl-2-aminoethanols, the anti-diuretic effect of these d(—)-N-alkyl-1-phenyl-2-aminoethanols is evidently not linked with a sympathomimetic or central nervous system activity.

This fact and also the fact that the anti-diuretic activity is exclusively found in the d-forms of the said N-alkyl-1-phenyl-2-aminoethanols were not to be foreseen. Thus, for example, the hitherto likewise unknown 1(+)-N-isopropyl-1-phenyl-2-aminoethanol and 1(+)-N-tert.butyl-1-phenyl-2-aminoethanol exhibit no anti-diuretic properties, even if the dosages are more than a hundred times higher. The therapeutic index of the d-compounds is considerably higher than that of the racemate, since the toxicity of the d-compound increases only slightly, compared with that of the racemate. Thus, surprisingly, the anit-diuretic activity is the essential and specific property of the said d(—)-N-(alkyl)-1-phenyl-2-aminoethanols and can therefore be utilized in therapy.

The d(—)-N-alkyl-1-phenyl-2-aminoethanols can be produced from the corresponding, partly known racemic compounds by resolution into the optical isomers according to the methods customary for the purpose. Instead of the racemic alkyl-1-phenyl-2-aminoethanols, suitable functional derivatives of these compounds, for example their O-acyl derivatives, may also be resolved into the optical isomers which are then hydrolysed to give the free, optically active compounds.

A preferred method of resolution is that via the salts with optically active acids, especially with 1(+)-tartaric acid and 1(—)-dibenzoyl-tartaric acid. Alternatively, the production can also be carried out directly by synthesis with the use of suitable optically active starting compounds. Thus, d(—)-1-phenyl-2-aminoethanols of the formula

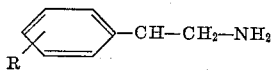

in which R has any of the above meanings, can be alkylated by treatment with reactive esters of alcohols of the general formula

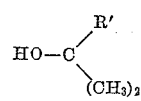

in which R' has the above significance, or it can be converted into the corresponding d(—)-N-alkyl-1-phenyl-2-aminoethanols by reductive alkylation in the presence of acetone.

It is further possible to produce the desired d(—)-N-alkyl-1-phenyl-2-aminoethanols from the corresponding d-N-alkyl-2-phenyl-2-chloroethylamines by treatment with silver oxide. The same result is attained when the corresponding 1-forms of the chloroethylamine derivatives are reacted with alkaline agents such as, e.g., alkali metal hydroxides, alkali metal carbonates or alkali metal acetates, the hydrolysis taking place with a Walden inversion. Finally, it is also possible to reduce d-mandelic acid-N-isopropylamide or -tert.butylamide, or d-mandelic acid-N-alkylamides which are appropriately substituted in the benzene nucleus, by means of lithium aluminum hydride to form the desired d(—)-N-alkyl-1-phenyl-2-aminoethanols. The latter can be converted into water-soluble salts by means of pharmaceutically acceptable non-toxic inorganic or organic acids.

The following examples are given for the purpose of illustrating the invention.

Example I

A solution of 722 g. of dl-N-tert.butyl-1-phenyl-2-aminoethanol (prepared by reacting styrene oxide with tert.butylamine in the presence of water, M.P. 89–90° C.) in 3000 ml. of methanol is added to a solution of 600 g. of 1(+)-tartaric acid in 1000 ml. of water. The mixture is allowed to cool and to stand overnight, the separated tartrate of 1(+) - N - tert.butyl-1-phenyl-2-aminoethanol obtained in an amount of 650 g. is filtered off and recrystallized from a mixture of methanol and water; M.P. 98° C., $[\alpha]_D^{20}+47.6°$ (methanol). The base is liberated by the addition of a sodium hydroxide solution and recrystallized several times from ethyl acetate. 250 g. of pure 1(+)-N-tert.butyl-1-phenyl-2-aminoethanol are obtained; M.P. 106–107° C., $[\alpha]_D^{20}+80.2°$ (chloroform); M.P. of the hydrochloride 180–181° C.

The mother liquor of the tartrate previously filtered off, is rendered alkaline with a sodium hydroxide solution, the separated d-base filtered off and recrystallized several times from ethyl acetate. 228 g. of d(—)-N-tert.-butyl-1-phenyl-2-aminoethanol are obtained; M.P. 106–107° C., $[\alpha]_D^{20}-80.5°$ (chloroform); M.P. of the hydrochloride 180–181° C., $[a]_D^{20}-49.4°$ (methanol).

Example II 191.6 g. of 1(—)-O,O-dibenzoyl-tartaric acid and 71.2 g. of dl-N-isopropyl-1-phenyl-2-aminoethanol are dissolved with heating in 240 ml. of methanol and 100 ml. of water, the mixture is cooled and allowed to stand at 0° C. for 24 hours. 131 g. of dibenzoyl tartrate crystalline from the solution and are recrystallized from 180 ml. of alcohol and 90 ml. of water; M.P. 165–167° C., $[\alpha]_D^{20}$ —62° (methanol). The salt is taken up in water and rendered alkaline with a sodium hydroxide solution. After filtering off, 26 g. of 1(+)-N-isopropyl-1-phenyl-2-aminoethanol are obtained; M.P. 84–85° C. (ligroin), $[\alpha]_D^{20}$ +75.4° (chloroform); M.P. of the hydrochloride 161–162° C.

Upon the addition of a sodium hydroxide solution, the mother liquor of the dibenzoyl tartrate previously filtered off yields 28 g. of crude d(—)-N-isopropyl-1-phenyl-2-aminoethanol which is purified by means of d(—)-tartaric acid. For this purpose, 17.9 g. of crude d(—)-N-isopropyl-1-phenyl-2-aminoethanol and 15 g. of d(—)-tartaric acid are dissolved in 65 ml. of methanol, 3 ml. of water and 240 ml. of ethyl acetate, the mixture is allowed to stand at 20° C. for several hours, and by trituration there are obtained 31 g. of the tartrate which is redissolved from 40 ml. of n-propanol and then yields 25 g. of the d-tartrate of d(—)-N-isopropyl-1-phenyl-2-aminoethanol; M.P. 161° C., $[\alpha]_D^{20}$ —58° (methanol). By adding a sodium hydroxide solution to this tartrate, the pure d(—)-N-isopropyl-1-phenyl-2-aminoethanol is obtained; M.P. 84–85° C., $[\alpha]_D^{20}$ —79.6° (chloroform); M.P. of the hydrochloride 162–163° C.

*Example III*

30 ml. of isopropylamine are added to a solution of 38 g. of d(—)-mandelic acid methyl ester in 50 ml. of alcohol, and the mixture is allowed to stand at room temperature for eight days. It is then concentrated by evaporation in a vacuum at 20–30° C., and the reaction product consisting of a mixture of d(—)-mandelic acid isopropyl-amide and d(—)-mandelic acid isopropyl ester is reduced by the dropwise addition to an ethereal suspension of 14 g. of lithium alanate. The mixture is heated under reflux for 16 hours, decomposed with 28 ml. of a 20% sodium hydroxide solution, filtered off with suction and the filter residue boiled three times with 100 ml. of benzene. The combined solutions are extracted with HCl and separated. Upon the addition of a sodium hydroxide solution, d(—)-1-phenyl-2-aminoethanol separates in an amount of 11.5 g. The product exhibits a rotation of $[\alpha]_D^{20}$ —44° (chloroform). The optically active base can be further purified by redissolution from ligroin.

What is claimed is:
1. The compound d(—)-N-tert.butyl-1-phenyl-2-aminoethanol.
2. The compound d(—)-N-isopropyl-1-phenyl-2-aminoethanol.

References Cited
UNITED STATES PATENTS

| | | | |
|---|---|---|---|
| 2,460,144 | 1/1949 | Moore et al. | 260—570.6 |
| 2,820,827 | 1/1958 | Ruschig et al. | 260—570.6 |
| 2,938,921 | 5/1960 | Mills | 260—570.6 |
| 2,967,130 | 1/1961 | Sanders et al. | 167—65 |
| 3,028,492 | 4/1962 | Wilbert et al. | 260—570.6 |
| 3,048,633 | 8/1962 | Russell et al. | 260—570.6 X |
| 3,081,230 | 3/1963 | Weinstock et al. | 167—65 |
| 3,236,892 | 2/1966 | Petracek | 260—570.6 |

OTHER REFERENCES

Devoghel et al.: "Archives Intern, Pharmacodynamie," vol. 26, pp. 471–4 (1960).

Osten: "Arznemittel-Forschung," vol. 5, pp. 84–87 (1955).

Read et al.: "Journal Chemical Society London," 1930, pp. 2682–5.

Wagner et al.: "Synthetic Organic Chemistry," pp. 660, 662 and 663 (1953).

CHARLES B. PARKER, *Primary Examiner.*

R. V. HINES, *Assistant Examiner.*